United States Patent [19]

Matlock

[11] Patent Number: 5,096,118
[45] Date of Patent: Mar. 17, 1992

[54] TOGGLE TIE PLATE RAIL FASTENING SYSTEM

[76] Inventor: Gordon E. Matlock, 554 Sappington Bridge Rd., Sullivan, Mo. 63080

[21] Appl. No.: 276,128

[22] Filed: Nov. 25, 1988

Related U.S. Application Data

[63] Continuation of Ser. No. 22,113, Mar. 5, 1987, Pat. No. 4,819,869.

[51] Int. Cl.⁵ ............................................. E01B 9/16
[52] U.S. Cl. .................................. 238/298; 238/303; 238/315; 238/373
[58] Field of Search .............. 238/303, 297, 298, 315, 238/338, 343, 366, 367, 368, 371–373, 375, 377, 310, 287, 294, 295; 411/32–38, 54, 59

[56] References Cited

U.S. PATENT DOCUMENTS

| | | |
|---|---|---|
| 556,348 | 3/1896 | Harris . |
| 560,497 | 5/1896 | Harris . |
| 566,828 | 9/1896 | Weed . |
| 603,563 | 5/1898 | Harris . |
| 649,629 | 5/1900 | Charlton ..................... 238/306 X |
| 703,796 | 7/1902 | Lakhousky ........................ 411/54 |
| 811,262 | 1/1906 | Walling . |
| 836,425 | 11/1906 | Woodcock ........................ 238/298 |
| 870,255 | 11/1907 | Smith . |
| 919,757 | 4/1909 | Peaslee . |
| 943,198 | 12/1909 | McDonald ...................... 238/371 |
| 1,029,628 | 6/1912 | Peterson . |
| 1,081,702 | 12/1913 | Schomer . |
| 1,132,827 | 3/1915 | Busch ............................. 238/373 |
| 1,156,095 | 10/1915 | Perkins . |
| 1,318,640 | 10/1919 | Bergeron . |
| 1,404,076 | 1/1922 | Zile . |
| 1,431,176 | 10/1922 | Ogden ............................ 411/38 |
| 1,834,256 | 12/1931 | Rüping . |
| 1,881,973 | 12/1930 | Schmitt ........................... 411/38 |
| 2,822,986 | 2/1958 | Schreier . |
| 3,581,990 | 6/1971 | Kirik .............................. 238/283 |
| 3,987,962 | 10/1976 | Robbins ......................... 238/287 |

FOREIGN PATENT DOCUMENTS

| | | |
|---|---|---|
| 302041 | 11/1917 | Fed. Rep. of Germany ...... 238/297 |
| 11070 | 8/1902 | France ............................ 411/54 |
| 786852 | 9/1935 | France ........................... 238/377 |

*Primary Examiner*—Margaret A. Focarino
*Assistant Examiner*—Joseph D. Pape
*Attorney, Agent, or Firm*—Zarley McKee Thomte Voorhees & Sease

[57] ABSTRACT

A toggle tie plate rail fastening system is described for securing rails to wood cross-ties. A wear plate is secured to the upper surface of each of the cross-ties adjacent each end thereof. Each of the wear plates has a plurality of tubular toggles secured thereto which extend downwardly therefrom and which are received by openings formed in the cross-tie. A tie plate is positioned on each of the wear plates and has a rail supported thereon held thereto by a pair of hold-down plates. Bolt members extend downwardly through the hold-down plates and the tie plates and are received by the toggle members. Tightening of the bolts causes the toggles to compress and to move in to gripping engagement with the cross-tie.

6 Claims, 4 Drawing Sheets

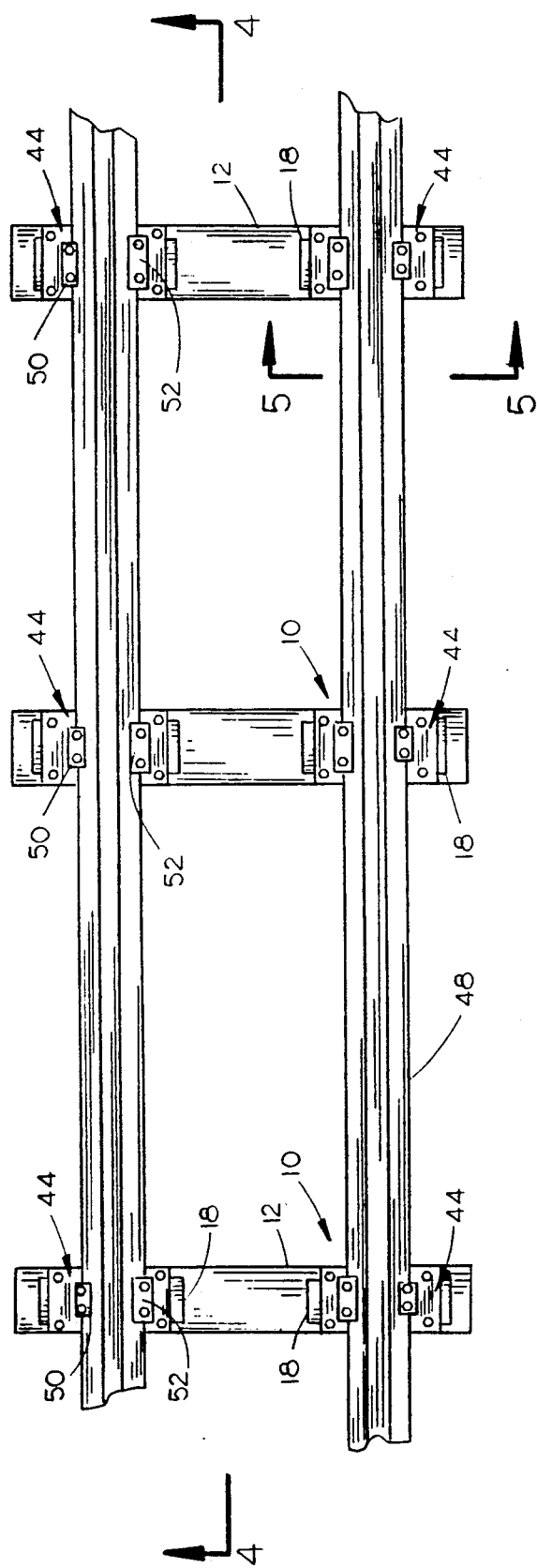
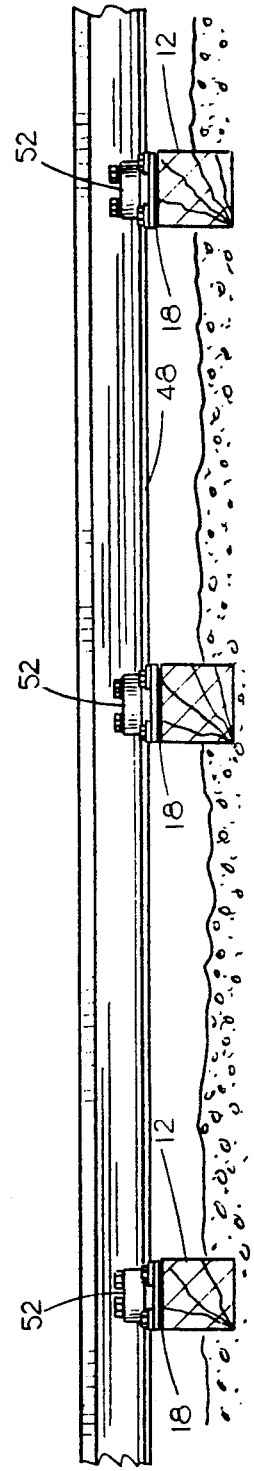

TOGGLE TIE PLATE RAIL FASTENING SYSTEM

CROSS-REFERENCE TO RELATED APPLICATION

This is a continuation application of application Ser. No. 22,113, filed Mar. 5, 1987, now U.S. Pat. No. 4,819,869.

BACKGROUND OF THE INVENTION

In the construction of railroad tracks, wood cross-ties are positioned on the roadbed and normally have a pair of spaced-apart tie plates mounted on the upper surface thereof which supports the rails. Normally, spikes are driven downwardly through openings formed in the tie plate into the cross-tie to maintain the tie plate thereon. Additionally, spikes are normally driven through openings formed in the tie plate downwardly into the cross-tie with the head of the spike engaging a portion of the rail to hold the rail on the tie plate. However, in severe service application, the spikes tend to loosen.

It is therefore a principal object of the invention to provide an improved rail fastening system for severe service application.

A further object of the invention is to provide a toggle tie plate rail fastening system for severe service application.

Yet another object of the invention is to provide a rail fastening system which not only includes means for securing a tie plate to a wood cross-tie but which also includes means for securing the rails to the tie plate.

These and other objects will be apparent to those skilled in the art.

BRIEF DESCRIPTION OF THE DRAWINGS

FIG. 3 is a plan view illustrating the rail fastening system of this invention being employed to secure rails to ties;

FIG. 4 is a sectional view as seen on lines 4—4 of FIG. 3;

SUMMARY OF THE INVENTION

Figure 1:
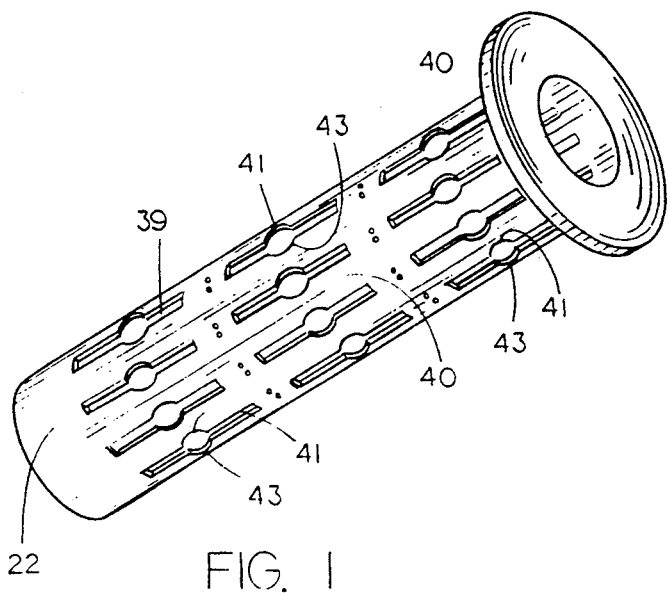
FIG. 1 is a perspective view of one of the tubular toggles which is employed with the invention.
Figure 2:
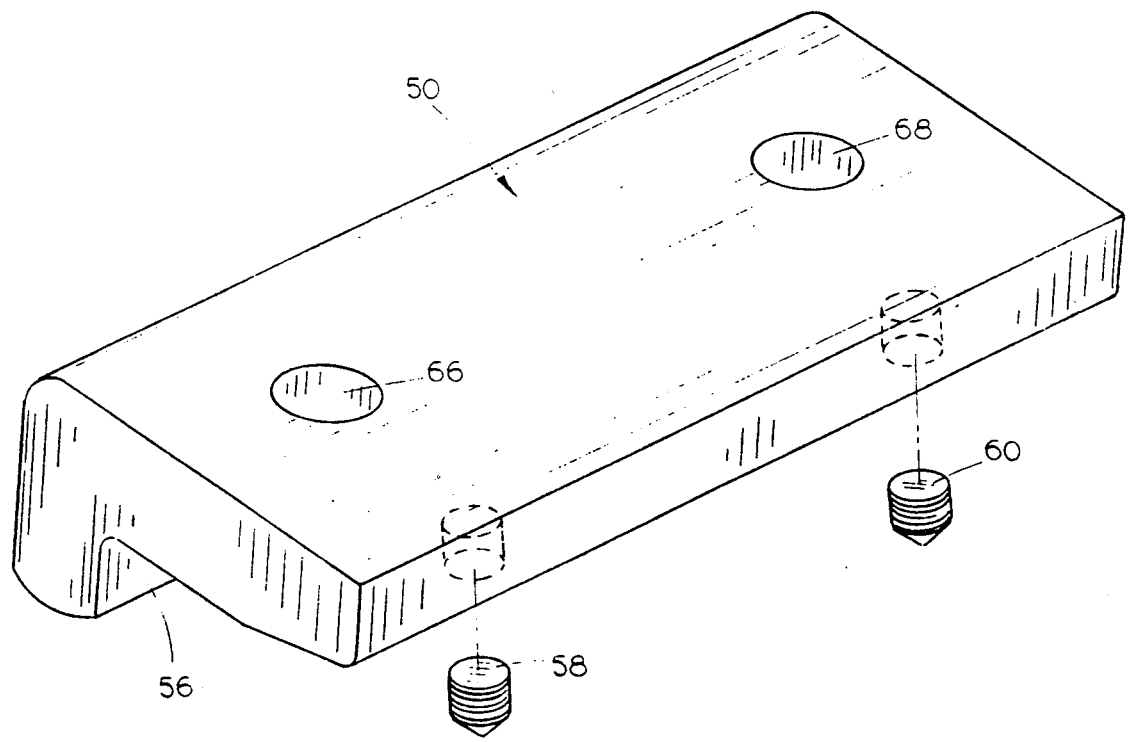
FIG. 2 is a perspective view of one of the rail hold-downs employed with this invention.
Figure 5:
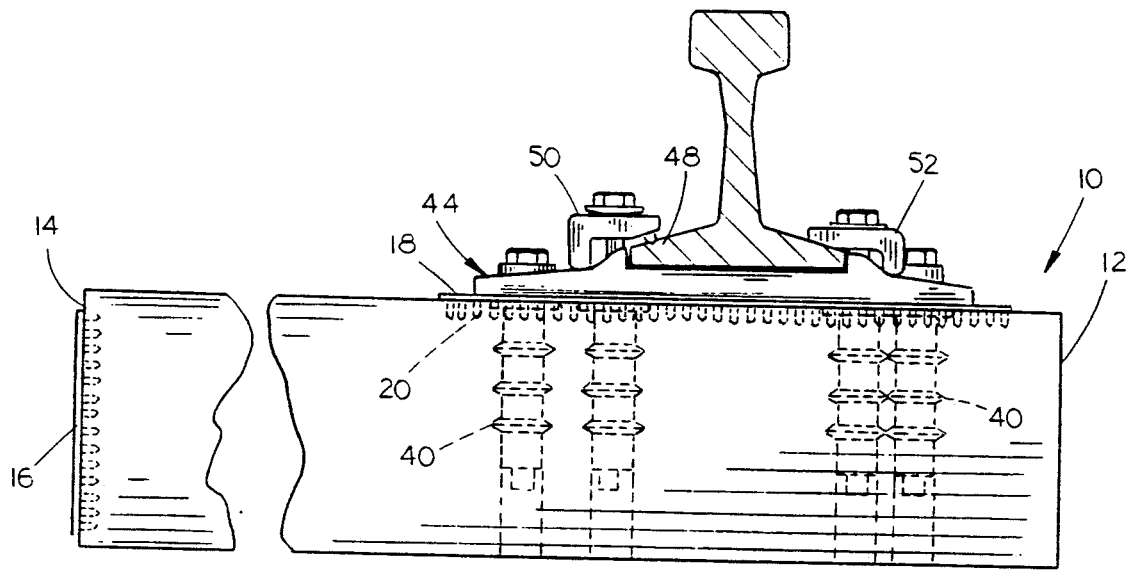
FIG. 5 is an enlarged partial sectional view as seen on lines 5—5 of FIG. 3.
Figure 6:
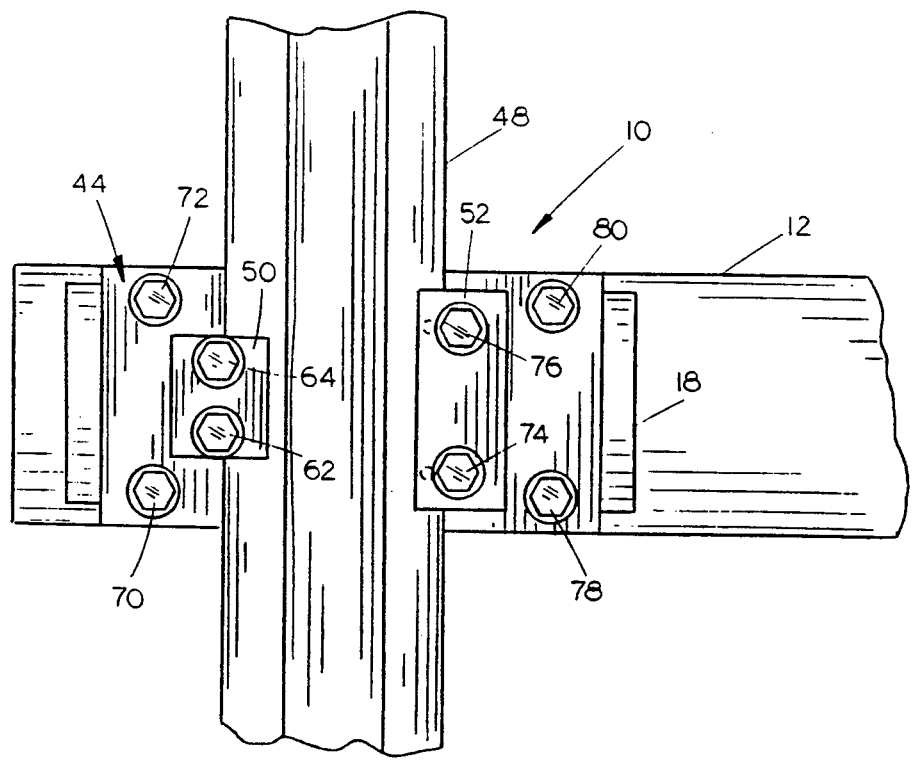
FIG. 6 is a partial top plan view illustrating the rail fastening system being used to maintain a rail on a wood tie.

A toggle tie plate rail fastening system is provided for securing the rails to wood cross-ties. A wear plate is positioned on the upper surface of each of the cross-ties adjacent each end thereof. The wear plate has several hundred teeth extending downwardly therefrom which are embedded in the tie to bond the wear plate to the tie. Each of the wear plates has a plurality of tubular toggles secured thereto which extend downwardly therefrom and which are received by openings formed in the cross-tie. Each of the tubular toggles has an internally threaded portion at its lower end adapted to threadably receive a bolt member. A tie plate is positioned on the wear plate and bolt members extend downwardly through openings in the tie plate for threadable attachment to the internally threaded portion on the toggles. Tightening of the bolt members causes the tubular toggles to expand outwardly into anchoring engagement with the cross-tie. A pair of rail hold-downs are positioned on opposite sides of each of the rails and have bolt members extending downwardly therethrough which are also threadably received by tubular toggles.

DESCRIPTION OF THE PREFERRED EMBODIMENT

In the drawings, the numeral 10 refers to a wooden cross-tie having opposite ends 12 and 14, and upper surface 16. It is recommended that each end of the tie 10 be end plated by means of an end plate 16, although the end plates do not form an integral part of the invention.

The numeral 18 refers to a wear plate having a plurality of spaced-apart teeth 20 extending downwardly therefrom. A wear plate 18 is secured to cross-tie 10 inwardly of each of the ends thereof. Each of the wear plates 18 acts as a barrier support surface plate and requires in excess of 25,000 pounds pressure to seat the approximately 360 teeth 20 into the tie 10. This means there is required at least 25,000 pounds pressure or force to push the wear plate deeper into the tie 10 from the wheel loading of the cars passing thereover thus providing a steel barrier support surface on top of the tie. Such is advantageous for prolonging the service life of the wood cross-tie as it prevents "plate kill" from the common tie plate as it is normally used when spiked directly to the tie. Rail vibration, out-of-round wheels and heavy loading of boxcars cause the tie plate to wear down into the tie thus creating the "plate kill". Each of the wear plates 18 shown herein has eight tubular toggle members 22, 24, 26, 28, 30, 32, 34 and 36 secured thereto and extending downwardly therefrom which register with openings formed in the wear plate. In some situations, only six toggle members will be employed as, for example, when the tie plate only has six openings formed therein. Inasmuch as each of the toggle members are identical, only toggle member 22 will be described in detail.

The upper ends of each of the toggle members are welded to the underside of the wear plate 18 and are provided with an internally threaded portion or nut 38 at the lower end thereof adapted to threadably receive a bolt member as will be described in more detail hereinafter. Each of the toggle members is preferably provided with three sets of openings or slots 39 with pairs of openings 39 defining expansion portions or teeth 40 which are adapted to move outwardly into anchoring engagement with the cross-tie when the bolt associated with the tubular toggle members is tightened. As seen in FIG. 1, each of the openings 39 has a pair of semicircular portions 41 and 43 which defined the teeth 40.

The cross-tie 10 is provided with eight openings (six in some cases) referred to generally by the reference numeral 42 which are adapted to receive the toggle members 22, 24, 26, 28, 30, 32, 34 and 36.

The numeral 44 refers to a tie plate having eight openings (six in some cases) formed therein which register with the toggle members 22, 24, 26, 28, 30, 32, 34 and 36 respectively. Tie plate 44 is provided with a central recessed area 46 adapted to receive the lower end of rail 48. Rail 48 is secured to tie plate 44 by a pair of rail hold-down members 50 and 52. Inasmuch as members 50 and 52 are identical, except for length, only member 50 will be described in detail. Hold-down member 50 includes a substantially horizontally disposed upper portion 54 having an outer end portion 56 which extends downwardly therefrom as seen in the drawings. A pair of steel tips 58 and 60 are embedded in the hold-down member 50 adjacent the inner end thereof and are adapted to engage the rail as seen in the drawings. Bolt members 62 and 64 extend downwardly through openings 66 and 68 formed in hold-down member 50, through openings formed in tie plate 44, through openings in wear plate 18 and into toggle members 26 and 28. The lower ends of bolt members 62 and 64 are threadably received by the internally threaded portions 38 in the associated toggle members and tightening thereof causes the toggle member to compress and to expand into anchoring engagement with the cross-tie 10 as seen in the drawings. Tightening of the bolt members 62 and 64 not only secures the rail to the tie plate but secures the rail and tie plate to the cross-tie.

Figure 7:
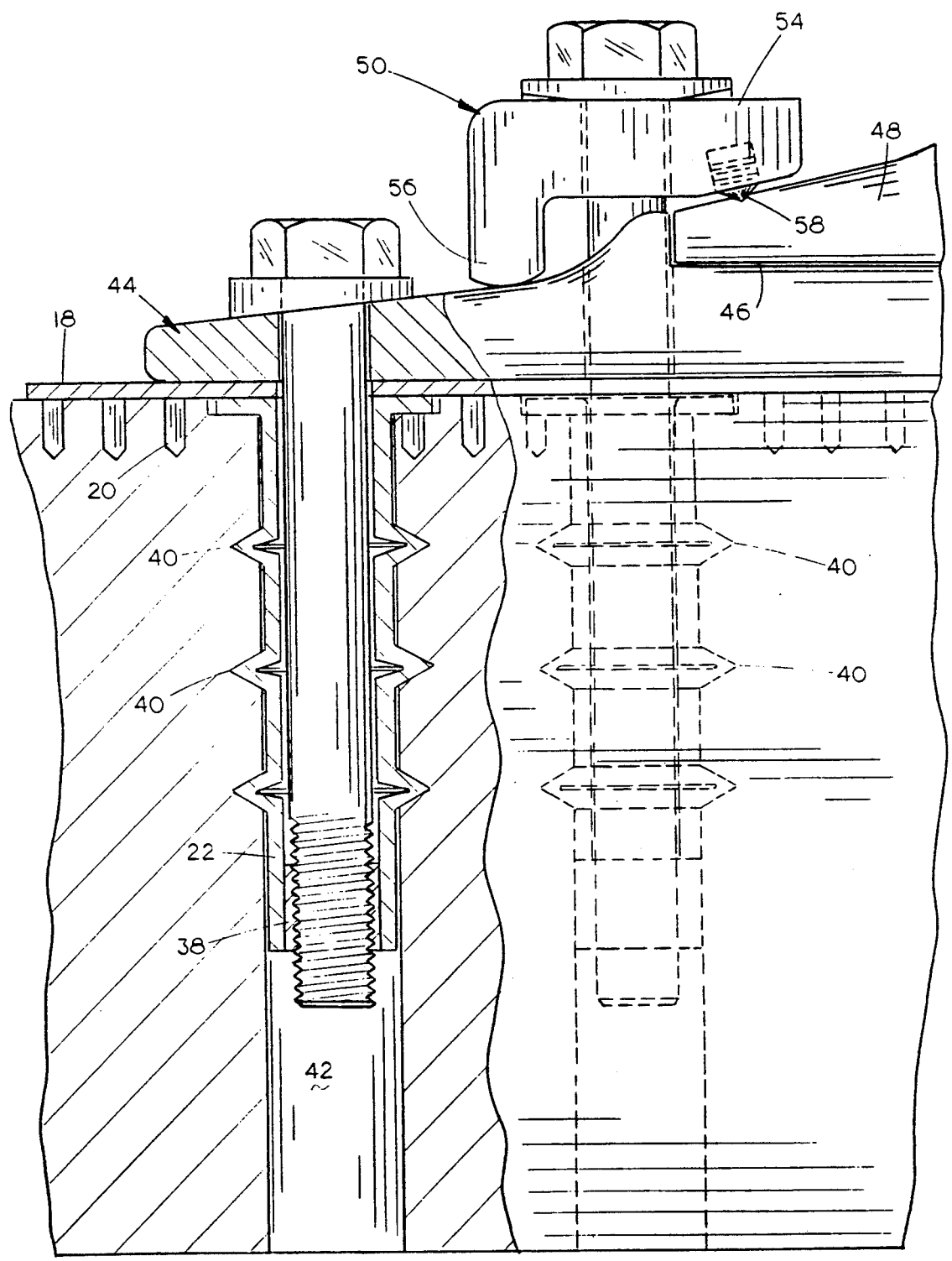
FIG. 7 is a sectional view illustrating the rail fastening system of this invention.

Bolt members 70 and 72 are extended downwardly through openings in tie plate 40 and are received by the toggle members 22 and 24 respectively. Tightening of bolt members 70 and 72 causes the toggle members 22 and 24 to compress and to move outwardly into anchoring engagement with the cross-tie. Bolt members 74 and 76 extend downwardly through hold-down member 52, through tie plate 44, through wear plate 18 and are received by the toggle members 34 and 36 respectively. Bolt members 78 and 80 extend downwardly through tie plate 44, through wear plate 18 and are received by the toggle members 30 and 32 respectively. Tightening of the various bolt members in their respective toggles causes the teeth 40 of the toggles to move into gripping engagement with the tie as illustrated in FIG. 7. The rail fastening system of this invention provides a convenient means for securing a tie plate and rail to a wood cross-tie which ensures that the rail and tie plate will not become loose during severe service.

Although the rail fastening system described herein has been shown to utilized eight toggle members, many tie plates utilize six openings and in those situations, six toggles would be employed as previously mentioned. In some situations, it may not be necessary to employ six or eight toggle members although it is preferred that the number of toggle members correspond to the number of openings in the tie plate. For example, a pair of toggle members could secure the wear plate to the tie with some other type of connection being employed to secure the tie plate to the tie. It can therefore be seen that a novel rail fastening system has been provided which ensures that the rail and tie plate will be positively anchored to the cross-tie and will not loosen during severe service. It can therefore be seen that the invention accomplishes at least all of its stated objectives.

I claim:
1. In combination,
an elongated, substantially horizontally disposed wood cross tie having opposite ends,
a horizontally disposed wear plate mounted on the upper surface of said cross tie adjacent each end thereof, each of said wear plates being bonded to the tie by means of a plurality of teeth extending downwardly therefrom which are embedded in the tie, said teeth being positioned uniformly across substantially the entire underside of said wear plate,
said plurality of teeth being great enough in number so as to require at least about 25,000 pounds of force to bond the wear plate to the tie,
said cross tie having a plurality of vertically disposed openings formed therein beneath each of said wear plates,
each of said wear plates having a plurality of openings formed therein which register with the openings in said tie, said wear plate having a plurality of tubular toggle members secured thereto extending downwardly therefrom into the openings in said cross tie, each of said toggle members having internally threaded portions adjacent the lower end thereof adapted to threadably receive a bolt member,
a tie plate positioned on each of said wear plates adapted to support a rail thereon, each of said tie plates having openings formed therein which register with said toggle members,
bolt members extending downwardly through the openings in said tie plate and being threadably received by the threaded portions of said toggle members whereby rotation of said bolt members in one direction will cause the toggle members to expand outwardly into anchoring engagement with the tie,
and means for securing the rails to said tie plates.
2. The combination of claim 1 wherein said means securing the rails to said tie plates comprises a pair of hold-down plates positioned on each side of the associated rail and means securing each of said hold-down plates to said wear plate.
3. The combination of claim 2 wherein said means securing each of said hold-down plates to said wear plate comprises bolt members extending downwardly throughout said hold-down plate, tie plate and into said toggle members.
4. In combination,
an elongated, substantially horizontally disposed wood cross tie having opposite ends,
a horizontally disposed wear plate mounted on the upper surface of said cross tie adjacent each end thereof, each of said wear plates being bonded to the tie by means of a plurality of spaced-apart teeth extending downwardly therefrom which are embedded in the tie,
said teeth being positioned uniformly across substantially the entire underside of said wear plate, and being great enough in number so as to require at least about 25,000 pounds of force to bond the wear plate to the tie,
said cross tie having a plurality of vertically disposed openings formed therein beneath each of said wear plates,
each of said wear plates having a plurality of tubular members secured thereto extending downwardly therefrom into the openings in said tie,
means securing said tubular members to said tie,
a tie plate positioned on each of said wear plates adapted to support a rail thereon, each of said tie plates having openings formed therein which register with tubular members,
means securing the rails to said tie plates,
and means securing said tie plates to said tubular members.
5. The combination of claim 1, wherein said wear plate includes at least about 360 teeth.
6. The combination of claim 4, wherein said wear plate includes at least about 360 teeth.

* * * * *